United States Patent
Kim et al.

(10) Patent No.: US 11,860,186 B2
(45) Date of Patent: Jan. 2, 2024

(54) FALL DETECTION APPARATUS AND METHOD

(71) Applicant: UNIVERSITY INDUSTRY FOUNDATION, YONSEI UNIVERSITY WONJU CAMPUS, Wonju-si (KR)

(72) Inventors: Youngho Kim, Wonju-si (KR); Jongman Kim, Wonju-si (KR); Bummo Koo, Wonju-si (KR); Hanul Jeong, Wonju-si (KR); Soonjae Ahn, Busan (KR); Seongjung Kim, Seoul (KR)

(73) Assignee: UNIVERSITY INDUSTRY FOUNDATION, YONSEI UNIVERSITY WONJU CAMPUS, Wonju-si (KR)

( * ) Notice: Subject to any disclaimer, the term of this patent is extended or adjusted under 35 U.S.C. 154(b) by 81 days.

(21) Appl. No.: 17/499,359

(22) Filed: Oct. 12, 2021

(65) Prior Publication Data
US 2022/0026456 A1 Jan. 27, 2022

Related U.S. Application Data

(63) Continuation of application No. PCT/KR2019/015130, filed on Nov. 8, 2019.

(30) Foreign Application Priority Data

Jun. 3, 2019 (KR) .................. 10-2019-0065303

(51) Int. Cl.
*G01P 3/00* (2006.01)
*G01P 15/18* (2013.01)
*G08B 21/04* (2006.01)

(52) U.S. Cl.
CPC ............... *G01P 3/00* (2013.01); *G01P 15/18* (2013.01); *G08B 21/043* (2013.01)

(58) Field of Classification Search
CPC .......... G01P 3/00; G01P 15/18; G08B 21/043
See application file for complete search history.

(56) References Cited

U.S. PATENT DOCUMENTS

| | | | |
|---|---|---|---|
| 8,990,041 B2* | 3/2015 | Grabiner | A61B 5/7275 702/141 |
| 2005/0121238 A1* | 6/2005 | Ishii | B62K 11/007 180/65.1 |
| 2009/0315719 A1 | 12/2009 | Song et al. | |

FOREIGN PATENT DOCUMENTS

| | | |
|---|---|---|
| KR | 20080050993 | 6/2008 |
| KR | 20080099752 | 11/2008 |

(Continued)

OTHER PUBLICATIONS

Ahn et al., "Pre-impact Fall Detection Using Vertical Angle and Acceleration Triangle Feature", Sep. 10-14, 2018, NMU Publication, pp. 1075-1078 (Year: 2018).*

(Continued)

*Primary Examiner* — Elias Desta
(74) *Attorney, Agent, or Firm* — CANTOR COLBURN LLP (57) ABSTRACT

Provided are a fall detection apparatus and method. The fall detection method may include measuring first to third accelerations corresponding to a user, measuring first to third angular velocities corresponding to the user, determining an acceleration value for the user based on at least one of the first to third accelerations, determining an angular velocity value for the user based on at least one of the first and second angular velocities, determining an angle value for the user based on at least one of the first to third accelerations, calculating a triangle feature using the acceleration value, (Continued)

and detecting a fall of the user based on at least one of the acceleration value, the angular velocity value, the angle value, and the triangle feature.

17 Claims, 3 Drawing Sheets

(56) References Cited

FOREIGN PATENT DOCUMENTS

| KR | 20110067416 | 6/2011 |
|---|---|---|
| KR | 20120108335 | 10/2012 |
| KR | 101460682 | 11/2014 |
| KR | 20160123642 | 10/2016 |

OTHER PUBLICATIONS

Huynh et al., "Optimization of an Accelerometer and Gyroscope-Based Fall Detection Algorithm," Mar. 2015, Hindawi Publication, vol. 2015, pp. 1-8 (Year: 2015).*

Ahn, et al., Evaluation of Inertial Sensor-Based Pre-Impact Fall Detection Algorithms Using Public Dataset, Sensors, 2019, vol. 19, No. 774, pp. 1-11.

International Search Report—PCT/KR2019/015130 dated Mar. 3, 2020.

\* cited by examiner

FALL DETECTION APPARATUS AND METHOD

BACKGROUND

Field

The present invention relates to a fall detection apparatus and method.

Description of the Related Art

In recent years, with the aging population, the number of elderly people and people with mobility difficulties are increasing, these people are experiencing unfortunate accidents caused by falls. In particular, the elderly people often live alone. Unlike younger people, the elderly people may be at risk even with small injuries. In fact, the elderly people who have weak strength may fall due to difficulty in balancing or a poor sense of balance. In this case, the elderly people fall down while relying on certain objects, and therefore may suffer from secondary injury, which may lead to major accidents.

In addition, in case where people fall forward, young people often suffer from bruises, but the elderly people may suffer from brain bleeding, which can be life-threatening. A brain injury caused by a fall may cause long-term aftereffects and may affect both thinking ability and a human body function.

In particular, according to the survey of the Korean Life Safety Association on fall accidents of 357 elderly people over 65 years old in Seoul from September 27 to 28, 2007, it was found that 8 out of 10 elderly people suffer from fall accidents, and as a result, it is urgent to introduce a fall detection technology that can prepare for fall accidents. The background of the present invention is disclosed in Korean Patent Laid-Open Publication No. 10-2008-0099752.

SUMMARY

An object to be achieved by the present invention is to provide a fall detection apparatus and method with higher accuracy than when using only acceleration and angular velocity by applying a threshold value using a triangle feature to the fall detection apparatus.

Another object to be achieved by the present invention is to provide a fall detection apparatus and method capable of detecting a fall faster than when using only a tilt angle due to a nonlinear feature.

Still another object to be achieved by the present invention is to provide an object to provide a fall detection apparatus and method capable of solving a problem of being mistaken for a fall while a user is lying down by using a fact that a triangle feature decreases after a tilt angle of 45°.

However, the technical problems to be achieved by the exemplary embodiments of the present invention are not limited to the technical problems as described above, and other technical problems may exist.

According to an aspect of the present invention, there is provided a fall detection method including: measuring first to third accelerations corresponding to a user; measuring first to third angular velocities corresponding to the user; determining an acceleration value for the user based on at least one of the first to third accelerations; determining an angular velocity value for the user based on at least one of the first and second angular velocities; determining an angle value for the user based on at least one of the first to third accelerations; calculating a triangle feature using the acceleration value; and detecting a fall of the user based on at least one of the acceleration value, the angular velocity value, the angle value, and the triangle feature.

The first to third accelerations may be an x-axis acceleration, a y-axis acceleration, and a z-axis acceleration, respectively, and the first and second angular velocities may be a pitch angular velocity and a roll angular velocity, respectively.

The acceleration value may be calculated through a square root for a sum of squares of the first to third accelerations, respectively.

The angular velocity value may be calculated through a square root for a sum of squares of the first and second angular velocities, respectively.

The acceleration value may be calculated by the following [Equation 1].

$$ACC_{SVM} = \sqrt{ACC_x^2 + ACC_y^2 + ACC_z^2} \qquad \text{[Equation 1]}$$

where $ACC_{SVM}$ is the acceleration value, $ACC_x$ may be the first acceleration, $ACC_y$ may be the second acceleration, and $ACC_z$ may be the third acceleration.

The angular velocity value may be calculated by the following [Equation 2].

$$\omega_{SVM} = \sqrt{\omega Pitch^2 + \omega Roll^2} \qquad \text{[Equation 2]}$$

where $\omega_{SVM}$ may be the angular velocity value, $\omega_{Pitch}$ may be the first angular velocity, and $\omega_{Roll}$ may be the second angular velocity.

The detecting of the fall further may include detecting the fall of the user by considering a comparison result of the acceleration value and a first reference value.

The detecting of the fall further may include detecting the fall of the user by further considering a comparison result of the angular velocity value and a second reference value.

The detecting of the fall further may include detecting the fall of the user by further considering a comparison result of the triangle feature and a third reference value.

The detecting of the fall further may include detecting the fall of the user when the acceleration value is smaller than the first reference value, the angular velocity value is greater than the second reference value, and the triangle feature is greater than the third reference value.

The first reference value may be 0.9 g, the second reference value may be 47.3°/s, and the third reference value may be 0.19.

The fall detection method may further include: determining the first reference value to the third reference value based on information on the user.

The information on the user may include at least one of an age, a gender, a body dimension, and a weight.

The fall detection method may further include: outputting information corresponding to the detected fall from a sensing unit using the information on the user as an input value.

The sensing unit may generate the input value to correspond to the age, the gender, the body dimension, and the weight, respectively, and may differently generate output information according to a generated comparison value based on output reference values allocated to each of the input values.

The fall detection method may further include: outputting the output information through at least one of a sound, an image, data, a signal, or light.

According to another aspect of the present invention, a fall detection apparatus may include: an acceleration measurement unit that measures first to third accelerations corresponding to a user; an angular velocity measurement unit that measures first to third angular velocities corresponding to the user; an acceleration value determination unit that determines an acceleration value for the user based on at least one of the first to third accelerations; an angular velocity value determination unit that determines an angular velocity value for the user based on at least one of the first and second angular velocities; an angle value determination unit that determines an angle value for the user based on at least one of the first to third accelerations; a triangle feature calculation unit that calculates a triangle feature using the acceleration value; and a fall detection unit that detects a fall of the user based on at least one of the acceleration value, the angular velocity value, the angle value, and the triangle feature.

The means for solving the problem described above are merely exemplary and should not be construed as limiting the present invention. In addition to the exemplary embodiments described above, additional exemplary embodiments may exist in the drawings and detailed description of the present invention.

Further, according to the present invention, there is an effect that accuracy is higher than when using only the acceleration and angular velocity by applying the threshold value using the triangle feature to the fall detection apparatus.

Further, according to the present invention, it is possible to detect a fall faster than when using only the tilt angle due to the nonlinear feature.

Further, according to the present invention, it is possible to solve the problem of being mistaken for a fall while the user is lying down.

However, the effects obtainable herein are not limited to the effects described above, and other effects may exist.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENT

Hereinafter, embodiments of the present invention will be described in detail with reference to the accompanying drawings so that those skilled in the art to which the present invention pertains may easily practice. However, the present invention may be implemented in various different forms, and is not limited to exemplary embodiments described herein. In addition, in the drawings, portions unrelated to the description will be omitted to obviously describe the present invention, and similar reference numerals will be used to describe similar portions throughout the specification.

In addition, throughout the present specification, when any one part is referred to as being "connected to" another part, it means that any one part and another part are "directly connected to" each other or are "electrically connected to" or "indirectly connected to" each other with the other part interposed therebetween.

Throughout the present specification, when any member is referred to as being positioned "on", "at upper portion", "at upper end", "under", "at lower portion", and "at lower end" another member, it includes not only a case in which any member and another member are in contact with each other, but also a case in which the other member is interposed between any member and another member.

Through the present specification and claims, unless explicitly described otherwise, "comprising" any components will be understood to imply the inclusion of other components rather than the exclusion of any other components.

The terms "about", "substantially", and the like used throughout this specification mean figures corresponding to manufacturing and material tolerances specific to the stated meaning and figures close thereto, and are used to prevent unconscionable abusers from unfairly using the present invention of figures precisely or absolutely described to aid the understanding of the present invention. The term "~step" or "~step of" used throughout this specification does not mean "~step for".

In the present specification, the term "unit" includes a unit realized by hardware, a unit realized by software, and a unit realized by both the hardware and software. Further, one unit may be realized by two or more hardware, and two or more units may be realized by one hardware.

In the present specification, some of the operations or functions described as performed by a terminal, an apparatus, or a device may be performed instead in a server connected to the corresponding terminal, apparatus, or device. Similarly, some of the operations or functions described as being performed by a server may be performed in a terminal, an apparatus, or a device connected to the corresponding server. Hereinafter, exemplary embodiments of the present invention will be described in detail with reference to the accompanying drawings.

The present invention relates to a fall detection apparatus and method and relates to an algorithm for detecting a fall using an acceleration tilt angle and a triangle feature before an impact occurs using an inertial sensor. Hereinafter, a fall detection apparatus (hereinafter referred to as "the present apparatus") according to an embodiment of the present invention will be described.

The fall detection apparatus 1 is an apparatus that detects a fall by receiving acceleration and angular velocity values from an inertial sensor (not illustrated) attached to a user, and the inertial sensor and the fall detection apparatus 1 can be connected through a network. At this time, the network refers to a connection structure capable of exchanging information between each node, such as a plurality of terminals and servers. Examples of such a network include a 3rd generation partnership project (3GPP) network, a long term evolution (LTE) network, a world interoperability for microwave access (WIMAX) network, Internet, a local area network (LAN), a wireless local area network (wireless LAN), a wide area network (WAN), a personal area network (PAN), a Bluetooth network, a satellite broadcasting network, an analog broadcasting network, a digital multimedia broadcasting (DMB) network, and the like, but are not limited thereto.

Figure 1:
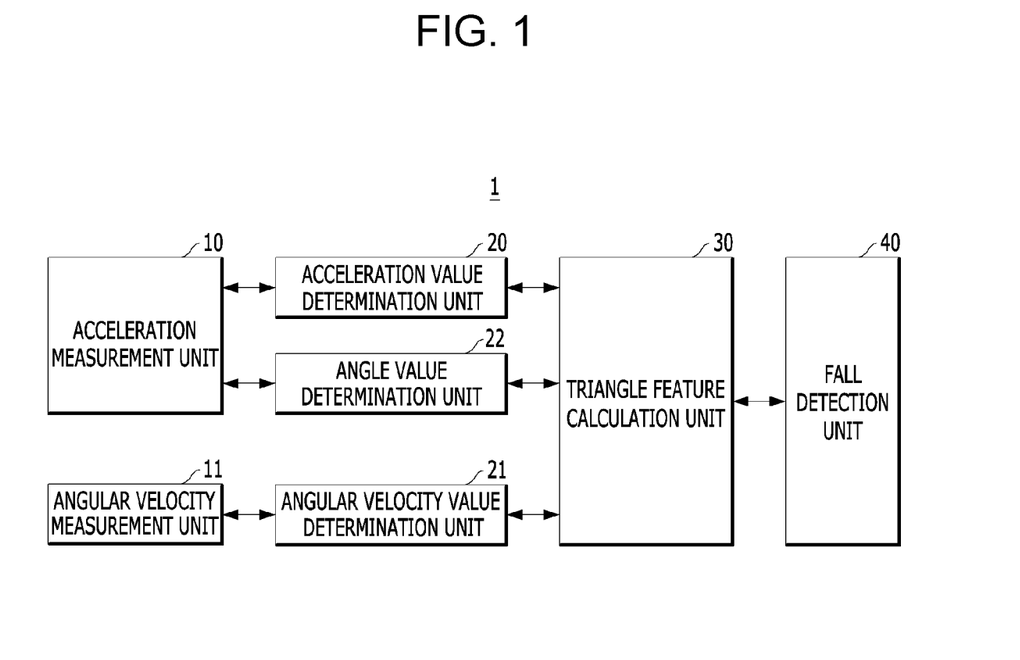
FIG. 1 is a schematic configuration diagram of a fall detection apparatus according to an exemplary embodiment of the present invention.

FIG. 1 is a schematic configuration diagram of a fall detection apparatus according to an exemplary embodiment of the present invention.

Referring to FIG. 1, the fall detection apparatus 1 according to the present invention may include an acceleration measurement unit 10, an angular velocity measurement unit 11, an acceleration value determination unit 20, an angular velocity value determination unit 21, an angle value determination unit 22, a triangle feature calculation unit 30, and the fall detection unit 40. However, since the present apparatus 1 of FIG. 1 is only an example of the present invention, according to various exemplary embodiments of the present invention, the present apparatus 1 may also be configured differently from FIG. 1.

The fall detection apparatus 1 is implemented as a single device as illustrated in FIG. 1, and may receive acceleration and angular velocity measured by a sensor, determine a triangle feature based on acceleration and angular velocity, determine to be a fall when the acceleration, the angular velocity, and the triangle feature satisfy conditions of a first reference value to a third reference value determined in advance to detect a fall of a user, and output information corresponding to the detected fall.

The sensor may be worn on a user's body such as a waist and may measure the acceleration and the angular velocity to transmit data on the acceleration and the angular velocity to the fall detection apparatus 1. The sensor can include an inertial sensor, and may be, for example MPU-9150 (Invensens®, USA). In addition, the sensor may be worn on a user's waist constituted by any one of a ring type, a band type, and a belt type.

Such a sensor may transmit and receive fall detection information using short-range wireless communication with a mobile communication terminal. An example of the short-range wireless communication may be Bluetooth. The Bluetooth means a standard that enables real-time communication in both directions by wirelessly connecting computers, mobile communication terminals, and other various electric and electronic apparatuses for short distance.

On the other hand, in another exemplary embodiment, the fall detection apparatus 1 may include a mobile communication terminal (not illustrated). Here, a mobile communication terminal H is a mobile communication apparatus in which portability and mobility are guaranteed, and examples thereof may include all types of handheld-based wireless communication devices such as personal communication system (PCS), global system for mobile communication (GSM), personal digital cellular (PDC), personal handyphone system (PHS), personal digital assistant (PDA), international mobile telecommunication (IMT)-2000, code division multiple access (CDMA)-2000, W-code division multiple access (W-CDMA), a wireless broadband Internet (Wibro) terminal, a smart phone, a smart pad, a tablet PC, and the like.

In relation to this, information corresponding to a fall may be sound information and vibration information, in which the sound information may be output using a mobile communication terminal and a speaker module, and the vibration information may be output using a vibrator of the mobile communication terminal.

Hereinafter, each configuration of the fall detection apparatus 1 will be described in detail with reference to FIG. 1.

The acceleration measurement unit 10 may measure first to third accelerations corresponding to a user. The acceleration measurement unit 10 may include a three-axis acceleration sensor. First, the acceleration sensor refers to a sensor that detects a change in speed per unit time, and detects dynamic forces such as acceleration, vibration, and shock. In the 3-axis acceleration sensor, the acceleration sensors are located in each of the 3-axis x, y, and z axes, and the absolute direction of the sensor can be measured using the acceleration values generated in the x, y, and z axes based on the gravitational acceleration. That is, each of the first to third accelerations measured by the acceleration measurement unit 10 may be x-axis acceleration, y-axis acceleration, and z-axis acceleration.

The angular velocity measurement unit 11 may measure first and second angular velocities corresponding to a user. The angular velocity measurement unit 11 may include a 3-axis gyro sensor. First, the gyro sensor is also called a gyroscope, and refers to a sensor that detects angular velocity and senses rotational inertia. The 3-axis gyro sensor may acquire an angular velocity value at which an object rotates in a unit time because the gyro sensor is located in each of three directions of the x, y, and z axes. At this time, rotation about the x-axis is called roll, rotation about the y-axis is called pitch, and rotation about the z-axis is called yaw. That is, each of the first and second angular velocities measured by the angular velocity measurement unit 11 may be a pitch angular velocity and a roll angular velocity.

Here, the acceleration measurement unit 10 and the angular velocity measurement unit 11 may be implemented as the above-described sensor (not illustrated).

The acceleration value determination unit 20 may determine the acceleration value for the user based on at least one of the first to third accelerations measured by the acceleration value measurement unit 11 described above. Specifically, the acceleration value determination unit 20 may calculate the acceleration value through a square root of a sum of squares of each of the first to third accelerations.

Hereinafter, an example in which the acceleration value determination unit 20 determines the acceleration value based on Equation 1 will be described.

$$ACC_{SVM} = \sqrt{ACC_x^2 + ACC_y^2 + ACC_z^2} \qquad \text{[Equation 1]}$$

The acceleration value determination unit 20 uses the x-axis acceleration $ACC_x$ (first acceleration), the y-axis acceleration $ACC_y$ (second acceleration), and the z-axis acceleration $ACC_z$ (third acceleration) to obtain the acceleration value ($ACC_{SVM}$).

The angular velocity value determination unit 21 may determine the angular velocity value for the user based on at least one of the first and second angular velocities measured by the angular velocity value measurement unit 11 described above. Specifically, the angular velocity value determination unit 21 may calculate the angular velocity value through a square root of a sum of squares of each of the first and second angular velocities.

Hereinafter, an example in which the angular velocity value determination unit 21 determines the angular velocity value based on Equation 2 will be described.

$$\omega_{SVM} = \sqrt{\omega Pitch^2 + \omega Roll^2} \qquad \text{[Equation 2]}$$

Referring to Equation 2, the angular velocity value determination unit 21 may use a pitch angular velocity $\omega_{Pitch}$ and a roll angular velocity $\omega_{Roll}$ to obtain an angular velocity value ($\omega_{SVM}$). In addition, the angular velocity value determination unit 21 may use a yaw angle which is the z-axis acceleration.

The angle value determination unit 22 may determine the angle value for the user based on at least one of the first to third accelerations measured by the acceleration value measurement unit 11 described above.

Hereinafter, an example in which the angle value determination unit 22 determines the angle value based on Equation 3 will be described.

$$Deg_{Saggital} = \tan^{-1} \frac{ACC_z}{ACC_y} \times \frac{180}{\pi}$$

$$Deg_{Frontal} = \tan^{-1} \frac{ACC_x}{ACC_y} \times \frac{180}{\pi}$$

[Equation 3]

Referring to Equation 3, the angle value determination unit 22 may use $ACC_x$ which is the acceleration of the x-axis, $ACC_y$ which is the acceleration of the y-axis, and $ACC_z$ which is the acceleration of the z-axis to obtain angle values ($Deg_{Saggital}$, $Deg_{Frontal}$).

The triangle feature calculation unit 30 may calculate a triangle feature using the first to third accelerations.

Figure 2:
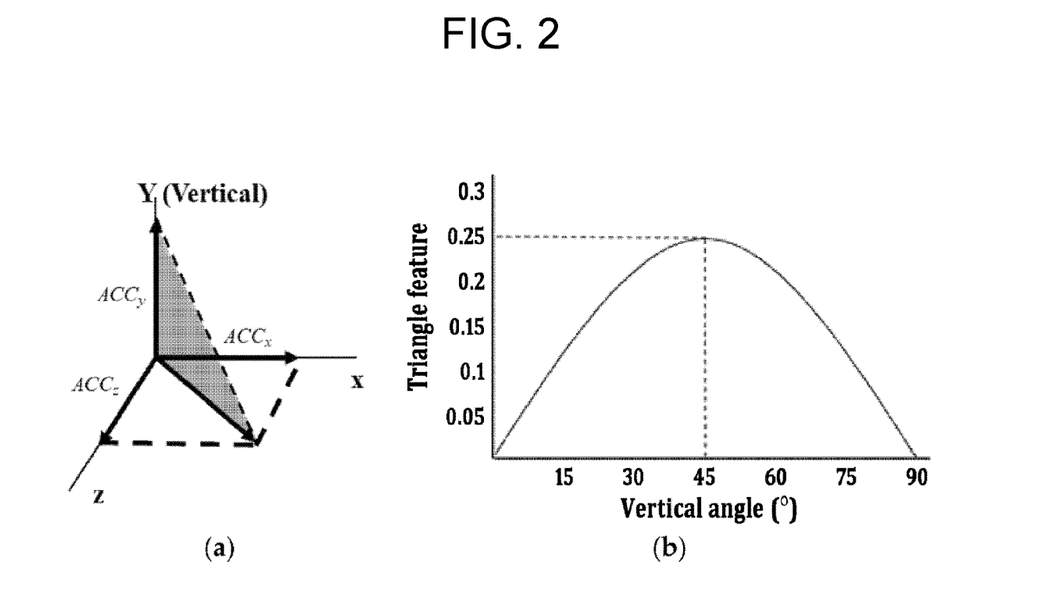
FIG. 2 is a diagram illustrating a definition of a triangle feature according to an exemplary embodiment of the present invention (FIG. 2A) and a change in the triangle feature according to a vertical angle of a user (FIG. 2B)

FIG. 2 is a diagram illustrating a definition of a triangle feature according to an exemplary embodiment of the present invention (FIG. 2A) and a change in the triangle feature according to a vertical angle of a user (FIG. 2B).

Referring to FIG. 2, the triangle feature may mean an area of a triangle formed by a sum of vectors of the x-axis acceleration and the z-axis acceleration and the y-axis acceleration (FIG. 2A). The triangle feature may increase until the vertical angle of the user reaches 45°, and may then decrease (FIG. 3B). That is, while the user is standing, the x-axis acceleration $ACC_x$, the y-axis acceleration $ACC_y$, and the z-axis acceleration $ACC_z$ may be 0 g, 1 g, and 0 g, respectively, and accordingly, the triangle feature may be 0. After the user falls, the x-axis acceleration $ACC_x$, the y-axis acceleration $ACC_y$, and the z-axis acceleration $ACC_z$ may be 0 g, 0 g, and 1 g, respectively, and accordingly, the triangle feature may be 0. In addition, when the vertical angle of the user is 45°, the X-axis acceleration $ACC_x$, the y-axis acceleration $ACC_y$, and the z-axis acceleration $ACC_z$ may be $1/\sqrt{2}$ g and $1/\sqrt{2}$g, respectively, and accordingly, the triangle feature may be 0.25.

The fall detection unit 40 may detect the fall of the user based on at least one of the acceleration value, the angular velocity value, the angle value, and the triangle feature.

Figure 3:
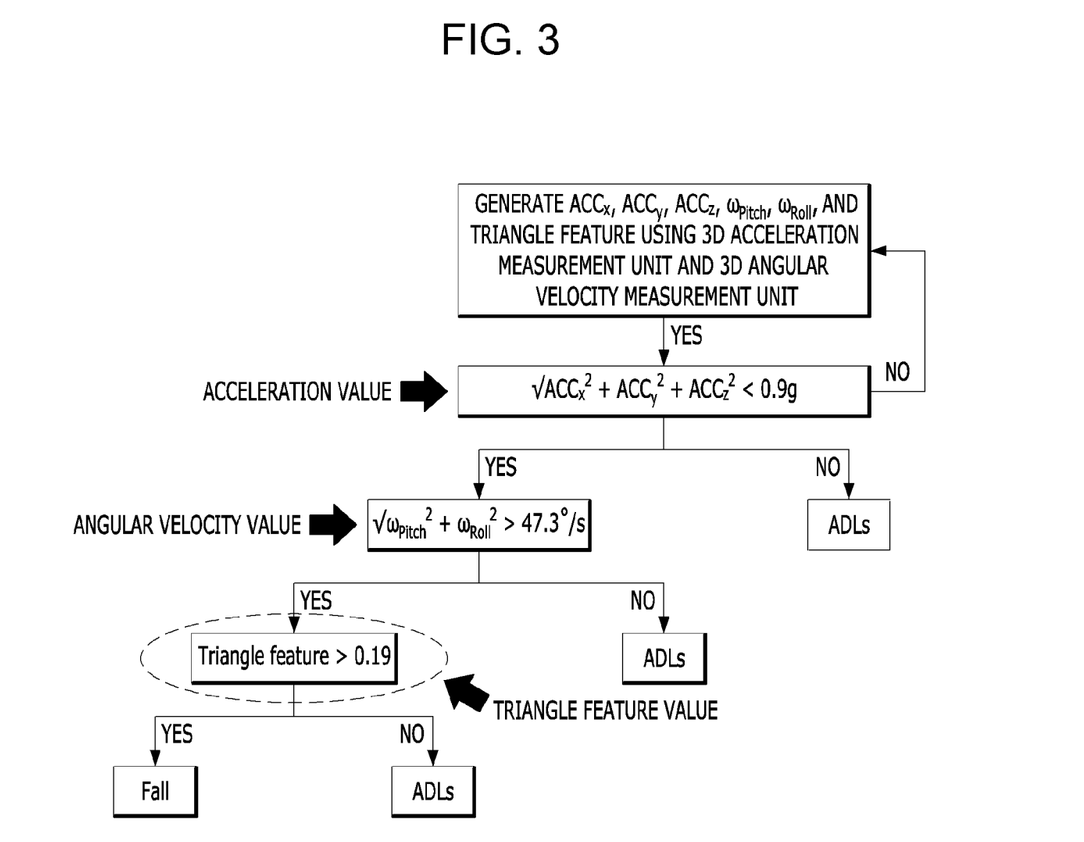
FIG. 3 is a diagram schematically illustrating an algorithm performed in a fall detection unit according to an exemplary embodiment of the present invention.

FIG. 3 is a diagram schematically illustrating an algorithm performed in the fall detection unit according to an exemplary embodiment of the present invention.

Referring to FIG. 3, when the acceleration measurement unit 10 and the angular velocity measurement unit 11 generate the x-axis acceleration, the y-axis acceleration, the z-axis acceleration, the pitch value, the roll value, and the triangle feature, the fall detection unit 40 may detect the fall of the user by considering a comparison result between an acceleration value and the first reference value. At this time, when the acceleration value is smaller than the first reference value, the fall of the user may be detected. When the acceleration value is greater than or equal to the first reference value, it may be determined that the user does not fall ('activities of daily living (ADLs)' in FIG. 3).

When the fall of the user is detected through the comparison result between the acceleration value and the first reference value, the fall of the user may be detected by further considering the comparison result between the angular velocity value and the second reference value. At this time, when the angular velocity value is greater than the second reference value, the fall of the user may be detected. When the angular velocity value is smaller than or equal to the second reference value, it may be determined that the user does not fall ('activities of daily living (ADLs)' in FIG. 3).

When the fall of the user is detected through the comparison result between the angular velocity value and the second reference value, the fall of the user may be detected by further considering the comparison result between the triangle feature and the second reference value. At this time, when the triangle feature is greater than the third reference value, the fall of the user may be detected. When the triangle feature is smaller than or equal to the third reference value, it may be determined that the user does not fall ('activities of daily living (ADLs)' in FIG. 3).

That is, when the acceleration value determined by the acceleration value determination unit 20 is smaller than the first reference value, the angular velocity value determined by the angular velocity value determination unit 21 is greater than the second reference value, and the angle value determined by the angle value determination unit 22 is greater than the third reference value, the fall detection unit 40 may detect the fall of the user when all of these cases are satisfied.

Meanwhile, the first reference value to the third reference value may be determined based on the user information. As an example of the first reference value to the third reference value, the first reference value may be 0.9 g, the second reference value may be 47.3°/s, and the third reference value may be 0.19. Here, the user information may include at least one of an age, a gender, a body dimension, and a weight.

The fall detection apparatus 1 may output information corresponding to a fall detected by a sensing unit (not illustrated) using the user information as an input value. Specifically, the sensing unit (not illustrated) may generate the input values to correspond to each of the age, gender, body dimension, and weight, and differently generate output information according to the comparison value generated based on the output reference value allocated to each input value.

Specifically, the fall detection apparatus 1 may include a sensing unit (not illustrated). The sensing unit may generate input values for each user information. For example, the sensing unit may designate an age value, a gender value, a body dimension value, and a weight value for the user information as the above-described input values. The sensing unit may generate output reference values allocated to each input value. For example, the sensing unit may set an age reference value, a gender reference value, a body dimension reference value, and a body weight reference value. Therefore, the sensing unit may differently generate the output information by comparing the input reference value with the output reference value allocated to the input value. For example, the fall accident may be more fatal to a user of the age of 50 to 70 than a user of the age of 20 to 30, so when a fall of a user of the age of 20 to 30 is detected, a sound of 50 to 60 dB may ring and when a fall of a user of the age of 50 to 70 is detected, a sound of 100 to 110 dB may ring. Here, the output information may be output through at least one of sound, image, data, signal, or light.

Hereinafter, the operation flow of the present invention will be briefly described based on the details described above.

Figure 4:
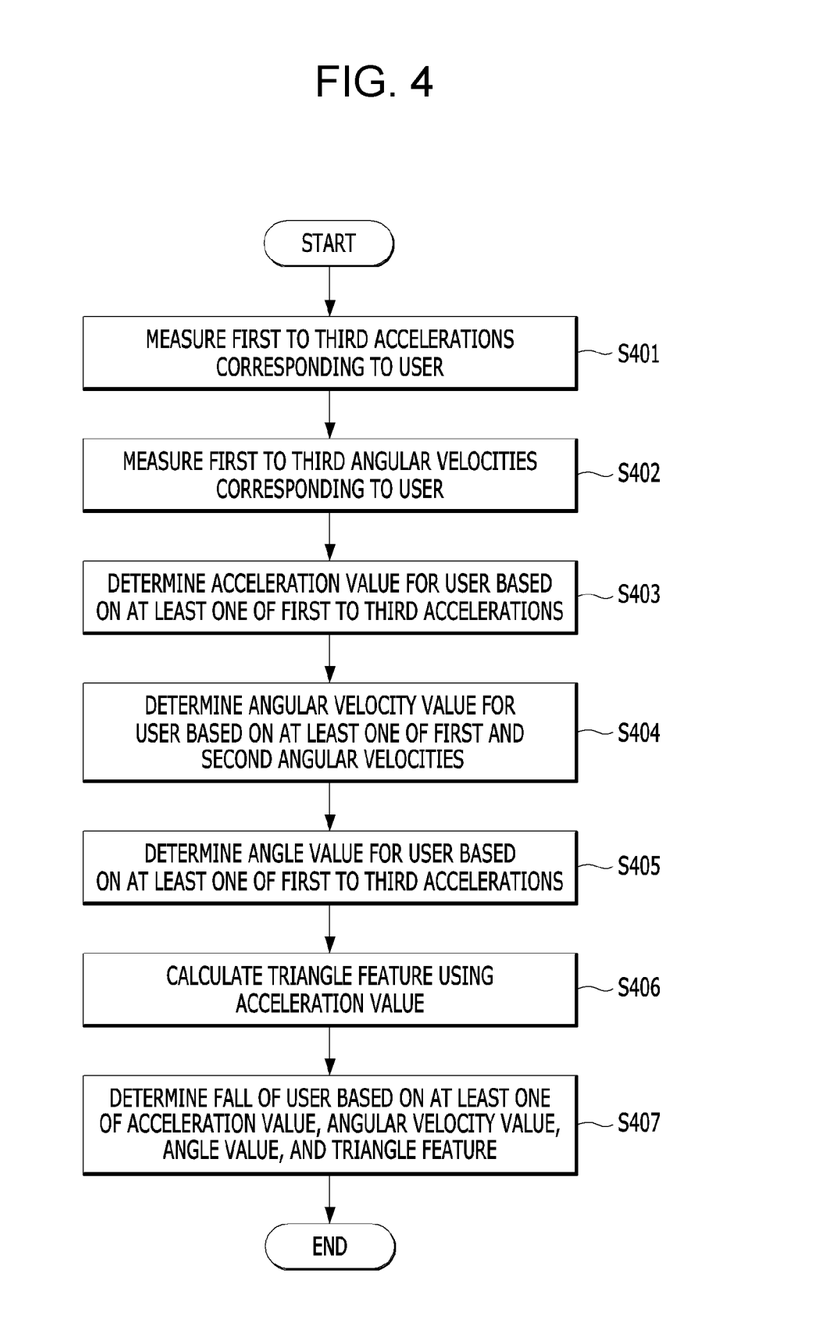
FIG. 4 is an operation flowchart for a control method of a fall detection apparatus according to an exemplary embodiment of the present invention.

FIG. 4 is an operation flowchart for a fall detection method according to an exemplary embodiment of the present invention.

The fall detection method illustrated in FIG. 4 may be performed by the fall detection apparatus 1 described above.

Therefore, even if omitted, the description of the fall detection apparatus 1 may be similarly applied to the description of the fall detection method.

In the fall detection method according to the exemplary embodiment of the present invention, first, first to third accelerations corresponding to a user may be measured (S401).

Next, it is possible to measure first to third angular velocities corresponding to the user (S402).

Next, the acceleration value for the user may be determined based on at least one of the first to third accelerations (S403).

Next, the angular velocity value for the user may be determined based on at least one of the first and second angular velocities (S404).

Next, the angle value for the user may be determined based on at least one of the first to third accelerations (S405).

Next, the triangle feature may be calculated using the acceleration value (S406).

Next, the fall of the user may be detected based on at least one of the acceleration value, the angular velocity value, the angle value, and the triangle feature (S407).

In the above description, steps S401 to S407 may be further divided into additional steps or combined into fewer steps, according to the implementation embodiment of the present invention. Also, some steps may be omitted if necessary, and the order between the steps may be changed.

The fall detection method according to the embodiment of the present invention may be implemented in a form of program commands that may be executed through various computer means and may be recorded in a computer-readable recording medium. The computer-readable recording medium may include a program command, a data file, a data structure or the like, alone or a combination thereof. The program commands recorded in the computer-readable recording medium may be especially designed and configured for the present invention or be known and usable by those skilled in a field of computer software. Examples of the computer-readable recording medium may include a magnetic medium such as a hard disk, a floppy disk, or a magnetic tape; an optical medium such as a compact disk read only memory (CD-ROM) or a digital versatile disk (DVD); a magneto-optical medium such as a floptical disk; and a hardware device specially configured to store and execute program commands, such as a ROM, a RAM, a flash memory, or the like. Examples of the program commands include a high-level language code capable of being executed by a computer using an interpreter, or the like, as well as a machine language code made by a compiler. The above-described hardware device may be constituted to be operated as one or more software modules to perform an operation according to the present invention, and vice versa.

In addition, the above-described fall detection method may also be implemented in the form of a computer program or application executed by a computer, stored in a recording medium.

The above description of the present invention is for illustrative purposes, and those skilled in the art to which the present invention pertains will understand that it is possible to be easily modified to other specific forms without changing the technical spirit or essential features of the present invention. Therefore, it should be understood that the above-mentioned embodiments are exemplary in all aspects but are not limited thereto. For example, each component described as a single type may be implemented in a distributed manner, and similarly, components described as distributed may be implemented in a combined form.

It is to be understood that the scope of the present invention will be defined by the claims rather than the above-mentioned description and all modifications and alternations derived from the claims and their equivalents are included in the scope of the present invention.

What is claimed is:

1. A fall detection method, comprising:
measuring first to third accelerations corresponding to a user;
measuring first to third angular velocities corresponding to the user;
determining an acceleration value for the user based on at least one of the first to third accelerations;
determining an angular velocity value for the user based on at least one of the first and second angular velocities;
determining an angle value for the user based on at least one of the first to third accelerations;
calculating a triangle feature using the acceleration value; and
detecting a fall of the user based on at least one of the acceleration value, the angular velocity value, the angle value, and the triangle feature.

2. The fall detection method of claim 1, wherein the first to third accelerations are an x-axis acceleration, a y-axis acceleration, and a z-axis acceleration, respectively, and
the first and second angular velocities are a pitch angular velocity and a roll angular velocity, respectively.

3. The fall detection method of claim 1, wherein the acceleration value is calculated through a square root for a sum of squares of the first to third accelerations, respectively.

4. The fall detection method of claim 3, wherein the acceleration value is calculated by the following [Equation 1]:

$$ACC_{SVM} = \sqrt{ACC_x^2 + ACC_y^2 + ACC_z^2} \qquad \text{[Equation 1]}$$

where $ACC_{SVM}$ is the acceleration value, $ACC_x$ is the first acceleration, $ACC_y$ is the second acceleration, and $ACC_z$ is the third acceleration.

5. The fall detection method of claim 4, wherein the detecting of the fall further includes detecting the fall of the user by further considering a comparison result of the angular velocity value and a second reference value.

6. The fall detection method of claim 1, wherein the angular velocity value is calculated through a square root for a sum of squares of the first and second angular velocities, respectively.

7. The fall detection method of claim 6, wherein the angular velocity value is calculated by the following [Equation 2]:

$$\omega_{SVM} = \sqrt{\omega_{Pitch}^2 + \omega_{Roll}^2} \qquad \text{[Equation 2]}$$

where $\omega_{SVM}$ is the angular velocity value, $\omega_{Pitch}$ is the first angular velocity, and $\omega_{Roll}$ is the second angular velocity.

8. The fall detection method of claim 7, wherein the detecting of the fall further includes detecting the fall of the user by further considering a comparison result of the triangle feature and a third reference value.

9. The fall detection method of claim 1, wherein the detecting of the fall further includes detecting the fall of the user by considering a comparison result of the acceleration value and a first reference value.

10. The fall detection method of claim 9, wherein the detecting of the fall further includes detecting the fall of the user when the acceleration value is smaller than the first reference value, the angular velocity value is greater than the second reference value, and the triangle feature is greater than the third reference value.

11. The fall detection method of claim 10, wherein the first reference value is 0.9 g, the second reference value is 47.3°/s, and the third reference value is 0.19.

12. The fall detection method of claim 10, further comprising:
determining the first reference value to the third reference value based on information on the user.

13. The fall detection method of claim 12, wherein the information on the user includes at least one of an age, a gender, a body dimension, and a weight.

14. The fall detection method of claim 13, further comprising:
outputting information corresponding to the detected fall from a sensing unit using the information on the user as an input value.

15. The fall detection method of claim 14, wherein the sensing unit generates the input value to correspond to the age, the gender, the body dimension, and the weight, respectively, and
differently generates output information according to a generated comparison value based on output reference values allocated to each of the input values.

16. The fall detection method of claim 15, further comprising:
outputting the output information through at least one of a sound, an image, data, a signal, or light.

17. A fall detection apparatus, comprising:
an acceleration measurement unit that measures first to third accelerations corresponding to a user;
an angular velocity measurement unit that measures first to third angular velocities corresponding to the user;
an acceleration value determination unit that determines an acceleration value for the user based on at least one of the first to third accelerations;
an angular velocity value determination unit that determines an angular velocity value for the user based on at least one of the first and second angular velocities;
an angle value determination unit that determines an angle value for the user based on at least one of the first to third accelerations;
a triangle feature calculation unit that calculates a triangle feature using the acceleration value; and
a fall detection unit that detects a fall of the user based on at least one of the acceleration value, the angular velocity value, the angle value, and the triangle feature.

* * * * *